United States Patent Office 3,302,681
Patented Feb. 7, 1967

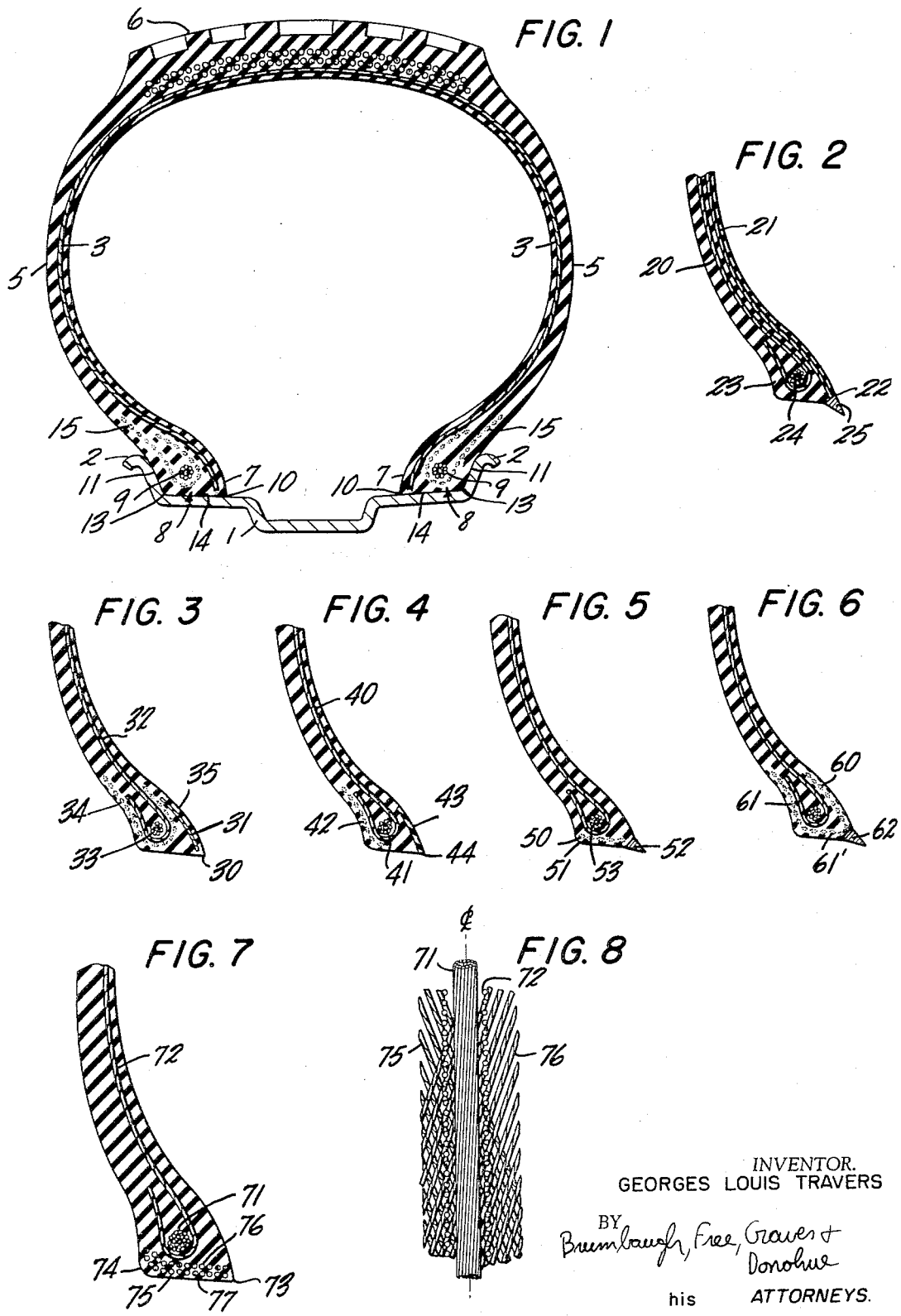

3,302,681
TIRE COVERS
Georges Louis Travers, Clermont-Ferrand, France, assignor to Compagnie Generale des Etablissements Michelin, raison sociale Michelin & Cie, Clermont-Ferrand, France
Filed May 10, 1965, Ser. No. 454,461
Claims priority, application France, May 19, 1964, 975,032; July 22, 1964, 982,699
7 Claims. (Cl. 152—362)

This invention relates to improvements in pneumatic tire casings, and it relates particularly to tire casings having improved bead reinforcements for mounting a casing on a wheel rim.

In general, a tire casing is sealed to a wheel rim by the pressure that the bead of the casing exerts against the rim in its seated position. This sealing action is affected by the shape and dimensions of the base of the bead, the configuration of the rim at the location where the bead is seated, and, of course, the inflation pressure inside the tire casing itself.

In tubeless tires when the minimum pressure inside the tire casing falls below a certain level, the sealing fit between the bead and its seat becomes ineffective so that when the casing, in the course of vehicle operation, is flexed and placed under stress, the beads have a tendency to slide inwardly towards the center of the wheel rim and rise from off their seats and may even vent the higher pressure inside the casing to the atmosphere.

Attempts have been made in the past to reinforce the beads to obviate the above difficulties. In one arrangement, the beads of the tire casings were stiffened by means of special carcass plies. This prior art construction and the other attempts have not been wholly satisfactory, and the above problem still remains.

Because of the tendency of the tire beads to imperfectly seat when the pressure within the tire casing is low, I have conducted research to determine a way to obviate this difficulty. On the basis of my research, I have determined that the tightness of contact between the rim and the bead can be greatly improved by the use of reinforcement plies which extend to a position adjacent the tip of the bead; the tip of the bead being that portion defined by the junction of the interior wall and the base wall of the bead. By use of the invention for reinforcing the bead tip, the grip of the bead on the rim of the wheel is improved, inasmuch as the bead tip becomes practically immobile and remains substantially unaffected by deformations of the tire casing.

Because of this invention, it is now possible to preserve a tight sealing fit between a bead and a tire rim of a tubeless tire, having an inflation pressure considerably below the minimum pressure now understood to be required for proper seating of the beads. For example, by employing the invention, it is now possible to reduce this minimum inflation pressure by approximately 0.3 kg./cm.$^2$ for a passenger car. Furthermore, I have found that the invention aids in more evenly distributing the stresses exerted on the beads and thus helps to reduce bead wear. In addition, by extending the bead tip by a flange portion and directing the extending flange inwardly and downwardly towards the center of the wheel rim, the tightness of contact between the rim and the bead can still be further improved.

In accordance with the present invention, a bead reinforcement consisting of at least one reinforcing ply should be positioned between the usual bead wires and a wall of the bead extending to and having its edge terminating in an area adjacent the bead tip. This reinforcement may be arranged along the interior or the base wall of the bead.

In an embodiment exemplifying the invention, two reinforcement plies are employed. One is placed along the interior wall and the other along the base wall of the bead. The two reinforcement plies must be spaced-apart in the tip area inasmuch as if they engage one another, they will adversely affect the grip of the bead on the wheel rim.

In another arrangement embodying the invention, at least one ply of cords, forming an angle in a range from about 10° to 45° with the center line of the bead wire is arranged along the base of the bead and extends between the outer and inner edges of the base of the bead. Two plies may, however, be arranged along the base wall, and if so, each preferably may form about a 15° angle on opposite sides of the center line of the wire beads. In such an arrangement, it has been found that locking between the bead and the rim of the tire is improved, and the stresses exerted on the bead are more evenly distributed.

For a further understanding of the present invention, reference may be had to the accompanying drawing, in which:

FIGURE 1 is a view in cross section, through a portion of the tire, embodying the present invention, shown mounted on the rim of a vehicle;

FIGURES 2 to 7 are schematic illustrations of different arrangements, partially broken away, embodying the present invention; and FIGURE 8 is a plan view in section, partially broken away, illustrating the wire beads and reinforcing plies of FIGURE 7.

The tire in accordance with the invention is illustrated in FIGURE 1. The tire casing is mounted on a wheel rim 1 of a conventional type having rim flanges 2. The casing can be used with other types of rims including those with demountable rim flanges. A carcass ply 3 of radial cords, for example natural fibers, synthetic fibers, metallic wires, glass fibers, and the like, reinforces the side walls 5 and tread 6 of the tire and extends downwardly between the interior wall 7 of the bead 8 and the bead wires 9 and terminates in an edge located proximate to the bead tip 10. It will be noted that each bead 8 comprises an interior wall 7 and exterior wall 11 which respectively terminate in an inner tip portion 10 and an outer heel portion 13 of a base wall 14 adapted to rest against the rim of the wheel. It will further be noted that a narrow ply 15 of non-radial cords extends downwardly around the bead wires 9 and upwardly along the exterior wall of the casing, insuring further reinforcement of the bead 8 and providing a tie or connection between the carcass ply 3 and the bead wire 9. By extending the inner edge of the ply 3 to the tip portion 10 of the bead, the tip portion is retained securely in air-tight engagement with the rim even at low inflation pressures.

In the embodiment of the invention shown in FIGURE 2, two radial carcass plies 20 and 21 are provided, one of which has an edge 22 terminating in the area of the tip 25 of the bead, the other extending downwardly around the bead wires 24 and upwardly along the wall 23 of the casing. In this arrangement, an elongated flange is provided in the bead tip 25. This flange, consisting of a rubber base material of high elasticity, directed inwardly and downwardly towards the center of the wheel rim, aids in sealing the beads to the rim and may be used with all the embodiments illustrated in the drawing.

FIGURE 3 illustrates a bead structure wherein the radial carcass ply 32 extends downwardly around the wire beads 33 and upwardly along the exterior wall of the casing. The tip reinforcing ply 31 is shown positioned beside the bead wire and runs along the interior wall 35 of the bead and terminates at the bead tip 30. In this arrangement, the bead is further stiffened by means of a ply 34 which is interposed between the tip reinforcing ply 31 and the carcass ply 32 extending downwardly around the carcass ply and upwardly adjacent to and terminating above the upward edge of the carcass ply. Preferably, the tip reinforcing ply 31 should extend along the interior wall 35 of the bead and side walls a distance substantially equal to twice the dimensions between the bead tip 30 and the bead wires 33. Furthermore, the tip reinforcing ply 31, preferably but not limited thereto, should consist of cords arranged in parallel fashion in radial planes.

FIGURE 4 shows still a further modification of a bead and comprises a radial carcass ply 40 extending downwardly about the wire beads 41 and upwardly along the exterior wall of the casing. The tip reinforcing ply 43 of a rubber having a hardness of 75° Shore A or rubber mixed with short lengths of steel wire or filaments extends from the tip 44 of the bead to just above the highest position of the bead wires 41. A stiffening ply 42 is located along the exterior wall of the bead.

In the structure illustrated in FIGURE 5, the tip reinforcing ply 50 is interposed between a conventional carcass ply and the wire beads 53 extending along the base wall from the heel 50 terminating in an edge adjacent to the tip 52 of the bead depicted as an elongated flange. The cords of the ply 50 may form an angle in a range from about 10° to 45° with the center line of the bead wires 53.

In FIGURE 6, a combination of two tip reinforcing plies 60 and 61 is shown. The first, 60, as in the arrangement of FIGURE 3, extends along the interior wall of the bead and terminates at an edge in the bead tip 62, whereas the second, 61, is shown running along the exterior wall of the side casing, downwardly, and around the carcass ply, adjacent to the base wall, terminating at an edge in the tip 62 spaced-apart from the edge of ply 60.

In FIGURES 7 and 8, the carcass ply 72 is the same as in FIGURE 5. Here, however, the two tip reinforcing plies 75 and 76 are arranged adjacent to the base 77 of the bead, and their cords form about a 20° angle, each on opposite sides of the centre line of the bead wires 71 while extending from the heel 74 to and terminating in edges at the tip 73 of the bead. As in FIGURE 5, the angle of each ply may, however, vary from about 10° to 45° with the center line.

From the preceding description, it will be apparent that the embodiments of the invention all include at least one reinforcing ply which terminates in an edge adjacent to the tip of the bead, thereby reducing deformation of the bead and loss of contact with the rim. This tip reinforcing ply may consist of natural fibers, such as rubber, synthetic fibers, metallic wires, glass fibers, and the like; if rubber, it should have a hardness of at least about 75° Shore A, or it may consist of a rubber mixture which is not hard but includes lengths of reinforcement wire.

It will be understood that modifications other than those illustrated in the drawings can be made in the arrangement of the plies and adjacent to the bead form without departing from the invention. For example, although the described embodiments all employ radial carcass plies, it will be readily appreciated that the invention is also applicable with crossed carcass ply tires. Accordingly, the forms of the invention described herein should be considered as illustrative and limited only as defined by the appended claims.

I claim:

1. A pneumatic tire casing having tread, side walls extending inwardly from opposite edges of said tread, and beads containing bead wires at inner edges of said side walls, each of said beads having a base wall and interior and exterior walls respectively joining said base wall at an inner tip portion and an outer heel portion, and a bead reinforcing ply entirely within each bead and arranged between said bead wire and one of said interior and base walls of said bead and having a free edge extending toward and terminating in an area in said bead adjacent to and spaced from said bead tip portion.

2. The tire casing as set forth in claim 1 wherein each of said beads includes an additional reinforcing ply interposed between the other of said base and interior walls and said bead wire and terminating in a free edge in and extending toward said bead area and spaced-apart from said bead reinforcing ply edge.

3. The tire casing as set forth in claim 1 wherein said bead reinforcing ply consists of cords positioned in parallel relation to one another.

4. The tire casing as set forth in claim 1 wherein said bead reinforcing ply is between said bead wire and said interior wall and is composed of rubber of a hardness of at least about 75° Shore A.

5. The tire casing set forth in claim 2 wherein said one ply is between said bead wire and said interior wall and said additional ply extends downwardly along and inwardly of the exterior of said bead, around said bead wire and along said base wall terminating at said free edge in said bead area.

6. The tire casing as set forth in claim 1 wherein said bead tip terminates in a flange directed inwardly and downwardly from said bead and wherein said flange is composed of a material of high elasticity.

7. The tire casing as set forth in claim 1 wherein said bead reinforcing ply comprises parallel cords forming an angle in a range from about 10° to 45° with the center line of said bead wire.

References Cited by the Examiner

UNITED STATES PATENTS

| | | | |
|---|---|---|---|
| 1,682,922 | 9/1928 | McKone | 152—362 |
| 2,592,844 | 4/1952 | Antonson | 152—362 |
| 3,081,811 | 3/1963 | Beckadolph et al. | 152—361 X |
| 3,242,965 | 3/1966 | Mirtain | 152—361 |

ARTHUR L. LA POINT, *Primary Examiner.*

MILTON BUCHLER, *Examiner.*

C. W. HAEFELE, *Assistant Examiner.*